UNITED STATES PATENT OFFICE.

T. TROWBRIDGE, OF DANBURY, CONNECTICUT.

IMPROVED COMPOSITION FOR STIFFENING HAT-BODIES.

Specification forming part of Letters Patent No. 48,328, dated June 20, 1865.

*To all whom it may concern:*

Be it known that I, TRUMAN TROWBRIDGE, of Danbury, in the county of Fairfield and State of Connecticut, have invented a new and useful Composition for Stiffening Hats, applicable also to other articles; and I do hereby declare that the following is a full, clear, and exact description of the same.

The principal object of my improvement is to provide a stiffening composition for hat-brims and analogous articles, which shall quickly set or become stiff after it is applied to the article, and thus render the hat-brim rigid. My improvement is also applicable for any other useful purpose, to all kinds of substances or articles.

In preparing my improved composition I take twenty-seven pounds of ordinary shellac of commerce, three pounds of ordinary sal-soda, and dissolve the same in five gallons of hot water. After the shellac is dissolved, I combine with the above mixture seven ounces of common salt dissolved in one gallon of hot water. The salt solution is to be slowly added, and the whole mass carefully stirred while the salt solution is being poured in. I then take four gallons of hot water and add to the whole mixture, carefully stirring the mass while the water is being introduced. When the mass is cold it is ready for use.

My improved composition is applied to hats in the same manner that the ordinary stiffening is used.

My improvement imparts more rigidity to the hat, gives it a softer and finer feeling or finish, and saves labor, because the stiffening can be applied when the hat is either wet or dry. The hat can be blocked within ten minutes after the application of the composition.

Having thus described my invention, I claim as new and desire to secure by Letters Patent—

The within-described composition, made of the ingredients specified, substantially as set forth.

The above specification of my invention signed by me this 16th day of March, 1865.

TRUMAN TROWBRIDGE.

Witnesses:
W. H. TUNDY,
WM. W. STEVENS.